United States Patent
Anderson et al.

(10) Patent No.: US 10,713,342 B2
(45) Date of Patent: Jul. 14, 2020

(54) TECHNIQUES TO DETERMINE DISTINCTIVENESS OF A BIOMETRIC INPUT IN A BIOMETRIC SYSTEM

(71) Applicant: Intel Corporation, Santa Clara, CA (US)

(72) Inventors: Glen J. Anderson, Beaverton, OR (US); Lenitra M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 900 days.

(21) Appl. No.: 14/866,341

(22) Filed: Sep. 25, 2015

(65) Prior Publication Data

US 2017/0091433 A1    Mar. 30, 2017

(51) Int. Cl.
| | |
|---|---|
| G06F 21/32 | (2013.01) |
| G06N 20/00 | (2019.01) |
| G06K 9/00 | (2006.01) |
| G06K 9/03 | (2006.01) |

(52) U.S. Cl.
CPC ......... *G06F 21/32* (2013.01); *G06K 9/00892* (2013.01); *G06K 9/036* (2013.01); *G06N 20/00* (2019.01)

(58) Field of Classification Search
CPC ...... G06F 21/32; G06N 99/005; G06N 20/00; G06K 9/00892; G06K 9/036; G06K 9/00087; G06K 9/00288; G06K 9/00617
See application file for complete search history.

(56) References Cited

U.S. PATENT DOCUMENTS

| | | | | |
|---|---|---|---|---|
| 6,424,971 B1 * | 7/2002 | Kreulen | ............... | G06F 17/3071 707/737 |
| 9,147,061 B1 * | 9/2015 | McClendon | ............ | G06F 21/32 |
| 2008/0002861 A1 | 1/2008 | Yano et al. | | |
| 2008/0101658 A1 | 5/2008 | Ahern et al. | | |
| 2008/0317292 A1 * | 12/2008 | Baker | ................. | G06K 9/00006 382/115 |
| 2009/0198112 A1 * | 8/2009 | Park | .................... | A61B 5/02438 600/301 |
| 2010/0111376 A1 * | 5/2010 | Yan | ..................... | G06K 9/00268 382/118 |

(Continued)

FOREIGN PATENT DOCUMENTS

| | | |
|---|---|---|
| KR | 1020070019363 | 2/2007 |
| KR | 1020080092789 | 10/2008 |

OTHER PUBLICATIONS

Kim, Machine Translation of Written Description of Korean Patent Application Titled"Method to Confirm Identification of Biometric System", Oct. 16, 2008, KR20080092789, pp. 1-6 (Year: 2008).*

(Continued)

*Primary Examiner* — Kamran Afshar
*Assistant Examiner* — Brent Johnston Hoover

(57) ABSTRACT

Various embodiments are generally directed to an apparatus, method and other techniques to receive a biometric input of a first input type, determine a distinctiveness value for the biometric input based on a comparison of an attributes score for the biometric input with an average of attributes scores for biometric inputs of the first input type from the plurality of biometric inputs, and determine an input type to use to perform an action based on the distinctiveness value.

23 Claims, 9 Drawing Sheets

(56) References Cited

U.S. PATENT DOCUMENTS

2015/0213244 A1     7/2015   Lymberopoulos et al.
2016/0127900 A1*   5/2016   John Archibald .... H04W 12/06
                                                                            726/7

OTHER PUBLICATIONS

Kim, Machine Translation of Claims of Korean Patent Application Titled "Method to Confirm Identification of Biometric System", Oct. 16, 2008, KR20080092789, pp. 1-6 (Year: 2008).*
Ross et al. "Information Fusion in Biometrics", Sep. 2003, Pattern Recognition Letters, vol. 24, Issue 13, pp. 1-18 (Year: 2003).*
Yang et al., "Fingerprint matching based on extreme learning machine", Jan. 14, 2012, Neural Computing and Applications, , vol. 22, Issue 3-4, pp. 435-445 (Year: 2012).*
International Search Report and Written Opinion received for PCT Patent Application No. PCT/US2016/053835, dated Jan. 13, 2017, 10 pages.

* cited by examiner

TECHNIQUES TO DETERMINE DISTINCTIVENESS OF A BIOMETRIC INPUT IN A BIOMETRIC SYSTEM

TECHNICAL FIELD

Embodiments described herein generally relate to techniques to determine distinctiveness of a biometric input in a system.

BACKGROUND

Biometrics is the statistical study of biological data. According to biometrics, every person has certain biological characteristics or traits that are virtually unique. In other words, biometric data can be used to identify an individual to a statistical certainty.

Biometric identification can be used for a variety of purposes, not the least of which is security. For instance, fingerprint scanners, retina scanners, DNA analyzers, facial recognition tools, and various other techniques and devices can collect biometric data and use the data to authenticate the identity of a would-be user. Biometric-based security measures can be used in place of, or in addition to, knowledge-based security measures, such as passwords or PINs (personal identification number) to access an ATM (automatic teller machine), a computer, a PDA (personal data assistant), a cell phone, or virtually any other device or service.

DETAILED DESCRIPTION

Figure 1A:
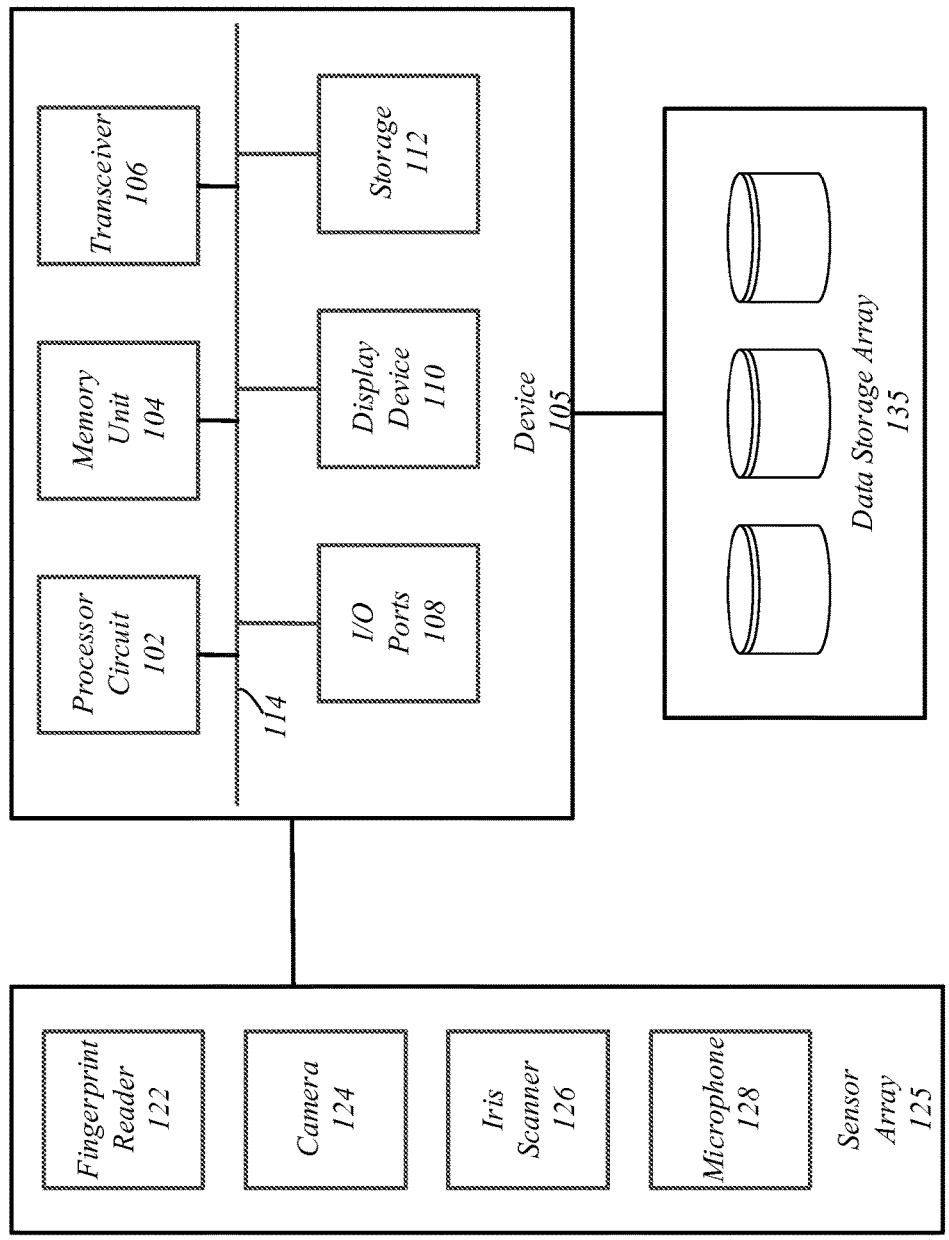
FIG. 1A illustrates an embodiment of a device.

Generally, embodiments include systems, devices, and techniques to determine differences or distinctiveness between biometric features of users in a biometric system. Biometric authentication relies upon pattern recognition to determine if the biometric data currently belongs to an authentic user. The distinctiveness of the biometric feature, the variability of the biometric, and availability of biometric (e.g. will all users have the biometric) are all things to consider for the biometric system. In some instances, authentication in a biometric system can be difficult because of the nature or type of biometric authentication. For example, a user may tend to authenticate from a place with poor lighting, making it more difficult to authenticate by visual analytics. In order improve reliability and responsiveness of authentication, embodiments include analyzing biometric distinctiveness of people in a group and automatically determine differential authentication processes and requirements.

Embodiments include a system that uses the biometric distinctiveness of individuals, relative to a group, along various factors like face and voice. If a user does not tend to stand out from others on one biometric, e.g., voice, face, finger, and so on, the system will recommend or require an alternative authentication mechanism, e.g., a retinal scan or a password.

Moreover, embodiment include analyzing data and information from biometric authentication training sessions and ongoing biometric authentication sessions and customize the authentication requirements, when needed, to allow reliable authentication from individuals. For example, a system may receive or detect a biometric input. More specifically, the biometric input may be received by a biometric sensor, such as a fingerprint reader, a camera, an iris scanner, a microphone, etc. In some embodiments, the biometric input may be captured by the biometric sensor based on a prompting made by the system or without a user's knowledge.

Further, the biometric input may be of a specific biometric input type based on the biometric sensor capturing and detecting the input. For example, a fingerprint reader may capture a biometric input having fingerprint input type, a camera may capture a biometric input having a facial input type, an iris scanner may capture a biometric input having an iris input type, and a microphone may capture biometric input having a sound input type. Embodiments are not limited to these examples.

The system may determine distinctiveness or a distinctiveness value for the biometric input based on a comparison of an attributes score for the biometric input with an average of attributes scores for biometric inputs of the first input type from a plurality of biometric inputs. The distinctiveness value may be a percentage difference between the attributes score for the biometric input and the average of attributes scores. Further, the attributes score are dependent on the type of biometric input and can be based on identifying features specific to the type of biometric input.

Further, an input type to use to perform an authentication or training may be chosen based on the distinctiveness value. Moreover, the input type may be selected based on whether the distinctiveness value is greater than, equal to, or less than a distinctiveness threshold value. If the distinctiveness value is greater than or, in some instances, equal to the distinctiveness threshold value, the input type may be the same input used for the received biometric input. However, if the distinctiveness value is less, and in some instances, equal to the distinctiveness threshold value the input type may be a type different than the received biometric input. Embodiments are not limited in this manner.

In one example, determining a distinctiveness value and selecting an input type based on the value may be advantageous when a person is training an authentication template. The system can compare the training to existing members and if members with similar variability or have difficulty authenticating the system could recommend another method to use for authentication decreasing the likelihood of an error or requiring multiple attempts.

In another example, during actual authentication the system attempting to determine who the person is, relative to the rest of the group, can compare the distinctiveness of the individual on some factor relative to others. Depending on distinctiveness, the system may recommend a different authentication mechanism. Such a system might be used at public events or in the home and also decrease the likelihood of an error.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an embodiment of a system 100 to process information and data. Moreover, system 100 includes a number devices, components, modules and processing circuitry to process information and instructions for biometric processing. In the illustrated embodiment, system 100 includes a sensor array 125 having a number of biometric sensors, a data storage array 135 having a number of data storage devices, and a device 105 having components to process information. Although, FIG. 1A illustrates system 100 having a limited number of components, embodiments are not limited in this manner.

In some embodiments, device 105 may be any type of computer including a personal computer, desktop computer, tablet computer, netbook computer, notebook computer, laptop computer, a server, a server farm, blade server, a symmetric multiprocessor (SMP) server, or any other type of server, and so forth. Additional examples of the device 105 include a tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers.

Device 105 includes a number of elements and components including a processor circuit 102, a memory unit 104, a transceiver 106, input/output (I/O) ports 108, a display device 110, and storage 112. These components may be utilized to process information and data as described in this disclosure. In addition, various aspects of elements and components described herein may be implemented in one or more of the components of device 105, such as the processor circuit 102. Embodiments are not limited in this manner.

As mentioned, device 105 includes a processor circuit 102 which can include one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor circuit 102 may be connected to and communicate with the other elements of the device 105 via interconnects 114, such as one or more buses, control lines, and data lines. In some embodiments, the processor circuit 102 may include processor registers or a small amount of storage available the processing units to store information including instructions that and can be accessed during execution. Moreover, processor registers are normally at the top of the memory hierarchy, and provide the fastest way to access data. These processor registers may be utilized to process information and data elements described herein.

The device 105 includes memory unit 104 to store information. Further, memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context. The memory unit 104 may be a secure memory or have a portion dedicated as secure.

The memory unit 104 can store data momentarily, temporarily, or permanently. The memory unit 104 stores instructions and data for device 105. The memory unit 104 may also store temporary variables or other intermediate information while the one or more processor unit 102 is executing instructions. In some embodiments, information and data may be loaded from memory unit 104 into the computing registers during processing of instructions by processor circuit 102. Manipulated data is then often stored back in memory unit 104, either by the same instruction or a subsequent one. The memory unit 104 is not limited to storing the above discussed data; the memory unit 104 may store any type of data.

The device 105 also includes a transceiver 106 which includes one or more components and circuitry to transmit and receive information using radio-frequency signals. More specifically, the transceiver 106 may include circuitry to produce radio-frequency mobile radio signals which are to be sent and for processing radio-frequency mobile radio signals which have been received. To this end, the transceiver 106 may be coupled to one or more antennas (not shown). The transmitted or received mobile radio signals are in one or more particular frequency ranges, which are typically prescribed by the mobile radio standard(s) supported by the radio-frequency assemblies. For example, transceiver 106 can include circuitry to process information according to one or more IEEE standards, one or more peer-to-peer protocols, and so forth. Various embodiments are not limited in this manner and transceiver 106 may transmit or receive information via any standard in any frequency range with one more devices, as previously mentioned.

In various embodiments, the transceiver 106 may be used to communicate with one or more other devices or stations via one or more antennas. The transceiver 106 may send and receive information from the stations as one or more pockets, frames, and any other transmission structure in accordance with one or more protocols.

The device 105 includes a display device 110 which may be any display device capable of displaying information received from processing circuit 102. The display device 110 may include at least one of a Liquid Crystal Display (LCD), a Thin Film Transistor-LCD (TFT-LCD), an Organic Light Emitting Diode (OLED), a flexible display, a three-dimensional (3D) display, touchscreen and/or touch sensitive display and a projector, for example. The display device 110 may display a User interface (UI) or a Graphical User Interface (GUI) associated with controlling functionality of the device 105. The device 105 may include two or more display units, according to various embodiments. The display device 110 may display any information or data associated device 105. For example, the display device 110 may display information related to one or more biometric actions including training operations and authentication operations. Embodiments are not limited in this manner.

In embodiments, the device 105 includes storage 112 which may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 112 may include technology to increase the storage performance enhanced protection for valuable digital media when multiple hard drives are included, for example. Further examples of storage 112 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

As mentioned, system 100 also includes a data storage array 135 and a sensor array 125 which may be coupled to device 100 via one or more connections, cables, interconnects, and so forth. The data storage array 135 and sensor array 125 may communicate information between each other and the device 105 for processing, as will be discussed in more detail below. Further, the sensor array 125 may include a number of biometric sensors including a fingerprint reader 122, a camera 124, an iris scanner 126, and a microphone 128 which may be used by a user to input information and data, such as one or more biometric inputs.

More specifically, each of the biometric sensors is capable of detecting, capturing, and processing a biometric input of a specific biometric input type. For example, the fingerprint reader 122 is capable of capturing a fingerprint input type, the camera 124 is capable of capturing a facial input type, the iris scanner 126 is capable of capturing an iris input type, and the microphone 128 is capable of capturing a sound input type. Embodiments are not limited to these types. Other biometric inputs may be contemplated and are capable of detecting different biometric input types.

In various embodiments, the fingerprint reader 122 may be any type of electronic device used to capture an image of a fingerprint pattern. The captured image is sometimes called a live scan. This live scan is digitally processed to create a biometric template (a collection of extracted features or points). The fingerprint reader 122 can use a number of different techniques to capture the digital image of the fingerprint including using optics, ultrasound, passive capacitance, and active capacitance. Embodiments are not limited in this manner and the fingerprint reader 122 can capture a fingerprint using other methods.

The camera 124 can be any type of image capturing device including a still camera and/or a video camera. In embodiments, the camera 124 can be a digital camera, an autofocus camera, a firewire camera, an infrared camera, and so forth. The camera 124 captures and encodes one or more digital images and/or videos in a digital format for later use. In some embodiments, the camera 124 can store digital images and digital videos in storage 112 or data storage array 135, for example. Embodiments are not limited in this manner.

In embodiments, the iris scanner 126 is any device capable of capturing an image of an eye. In some embodiments, the iris scanner 126 may be a camera similar to camera 124 discussed above. However, in embodiments, the sensor array 125 includes both a camera 124 and an iris scanner 126. The iris scanner 126 may be specifically designed to capture an image of a user's eye including supporting various resolution and technical requirements. In some embodiments, the iris scanner 126 may use the infrared light spectrum to capture an image of an eye. Embodiments are not limited in this manner.

The sensor array 125 also includes a microphone 128 which can be any device that is capable of converting acoustic or sound into an electrical signal. In instances, the microphone 128 use electromagnetic induction, capacitance change or piezoelectricity to produce the electrical signals from the sound or air pressure vibrations. Embodiments are not limited in this manner and microphone 128 may be any type of microphone including a carbon microphone, a dynamic microphone, a fiber optic microphone, a laser microphone, a liquid microphone, a MEMS microphone, and so forth. Further, the microphone 128 can be an omnidirectional microphone, a unidirectional microphone, a cardioid microphone, a bi-directional microphone, a parabolic microphone, etc. Embodiments are not limited in this manner.

As mentioned, the system 100 includes a data storage array 135 coupled with device 101. The data storage array 135 includes one or more storage devices capable of storing information and data. For example, data storage array 135 can store biometric information for a plurality of users that may be used by system 100. In embodiments the data storage array 135 includes storage devices implemented as a non-volatile storage devices such as, but not limited to, a magnetic disk drive, optical disk drive, tape drive, an internal storage device, and so forth. The data storage array 135 can be a network attached storage (NAS) array, and a storage area network (SAN) array including a module SAN array, a monolithic SAN array and a utility storage array. In embodiments, the data storage array 135 can be a cloud-based storage system which may implement storage virtualization. Embodiments are not limited in this example.

Figure 1B:
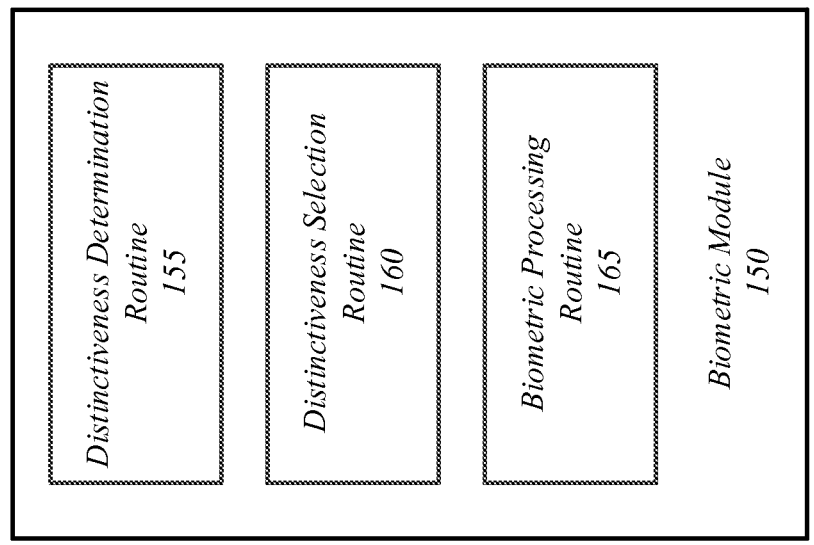
FIG. 1B illustrates an embodiment of a biometric processor.

FIG. 1B illustrates an example embodiment of a biometric module 150 to process data and information including biometric information. In embodiments, the biometric module 150 may at least be partially implemented in hardware. For example, the biometric module 150 can at least be partially implemented as one or more components of system 100, e.g. processor unit 102. In some embodiments, the biometric module 150 can be implemented as one or more software modules or routines which at least partially utilize elements and components of system 100. For example, one or more routines can utilize the processor circuit 102 to process and transform the information and data. In embodiments, the biometric module 150 includes routines to process and transform data and information. More specifically, biometric module 150 includes a distinctiveness determination routine 155, a distinctiveness selection routine 160, and a biometric processing routine 165. Embodiments are not limited to these specific elements and components.

The distinctiveness determination routine 155 processes information to determine distinctiveness between biometric inputs of a same biometric input type. For example, the distinctiveness determination routine 155 can determine the distinctiveness of a user's fingerprint image compared to a group of users' fingerprint images. The distinctiveness of other biometric input types, including a facial image, an iris image, and a voice sample, may also be determined. In embodiments, the distinctiveness may be a measure of the variations or differences in a biometric sample for a user compared to biometric patterns for a group of users or the general population. For example, a biometric sample for a user may be compared to biometric samples of other users of system 100 to determine whether there is a high or low likelihood of an error during authentication and identification. The higher the degree of distinctiveness, the more unique the identifier, and therefore, a lower likelihood of an error occurring. A low degree of distinctiveness indicates a biometric pattern that is found frequently in the compared group. Thus, there may be a higher likelihood of an error occurring.

Therefore, embodiments are directed to using distinctiveness to improve biometric systems, such as system 100, by determining whether the likelihood of an error is high or low and suggesting or requiring a user to identify with a different biometric input type when the likelihood of an error is high. In other words, the likelihood of errors may lowered by identifying and using one or more specific biometric input types that are distinctive for a user during authentication and identification.

The distinctiveness determination routine 155 may determine a distinctiveness value which indicates a percentage difference between features or attributes of a user compared to an average of attributes of a group of users or general population for the same biometric input type. For example, embodiments, include determining an attributes score for a user and an average of attributes score for a group or the general population and determining the distinctiveness value as the percentage difference between the user's attributes score and the group's average of attributes scores. An attribute score may be based on features and attributes of a particular biometric type that are used for identification and authentication.

For example, an attribute score for voice recognition may be determined by performing a Fourier transform on a biometric input, e.g. voice sample, and determining a distribution of frequencies. In this example, the distinctiveness value may be a percentage difference between the determined distribution of frequencies compared to an average of distribution of frequencies of other uses or the general population. Embodiments are not limited to this example for determining the attributes score for a voice biometric input and other feature distinguishing techniques may be used to determine an attributes based on a voice recognition algorithm.

In another example, an attributes score for a face recognition biometric input may be geometric values or values based on facial features, such as eigenvalues, for a facial input. The distinctiveness value for a facial biometric input may be the percentage difference between the user's geometric values and a group's average geometric values. Embodiments are not limited to this example and an attributes score may be based on the algorithm used for facial identification, such as linear discriminate analysis, elastic bunch graph matching, a hidden Markov model, multilinear subspace learning, and neuronal motivated dynamic link matching. Any of these algorithms may be used and an attributes score may be based on which algorithm used.

In another example, geometric values of minutiae points for a fingerprint biometric input of a user may be used to determine an attributes score for a fingerprint biometric input. Again, a distinctiveness value may be determined and based on the percentage difference of geometric values for a user compared to the average geometric values of a group. Embodiments are not limited to this example for a fingerprint biometric input. Determining an attributes score for a fingerprint biometric input may be based the algorithm used to process in the fingerprint biometric input, such as a matching algorithm or a pattern based algorithm.

In another example, an attributes score for an iris biometric input based on geometric values or feature values including point identifications that identify rings, furrows and freckles within the iris of the eye. These geometric or feature values may be based on a normalization of pixels of the iris biometric input. In some instances, the attributes score is a score generated from a bit pattern of the iris biometric algorithm. The distinctiveness value is the percentage difference of the user's attributes score compared to a group's average attributes score. Embodiments are not limited to this example and other techniques may be contemplated to determine an attributes score based on the algorithm used, such as a rubber-sheet model and algorithms using a Gabor wavelet.

Figure 2:
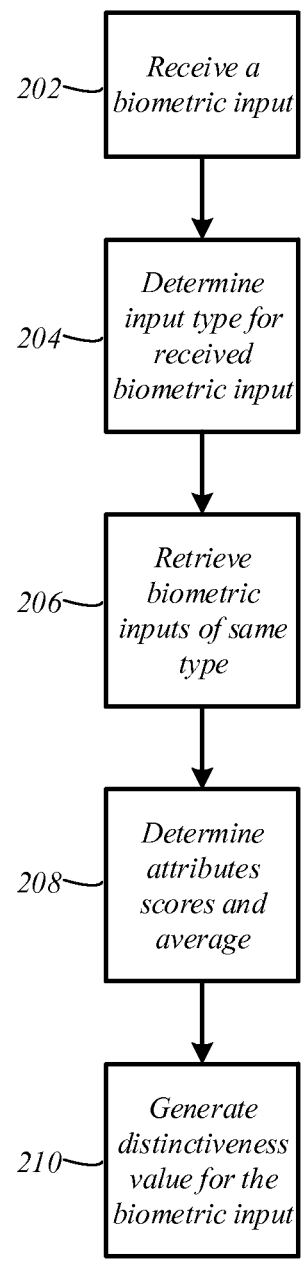
FIG. 2 illustrates an embodiment of a first flow diagram.

FIG. 2 illustrates one possible example of a first logic flow 200 which may be performed by distinctiveness determination routine 155 to determine a distinctiveness value for a biometric input. At block 202, the distinctiveness determination routine 155 may receive a biometric input which may have been generated or captured by a biometric sensor, such as one of the biometric sensors in the sensor array 135 of FIG. 1A. The distinctiveness determination routine 155 may receive the biometric input in a format based on the biometric input type, such as a fingerprint scan, a visual image of a face, an image of an eye or an iris of an eye, or a voice sample. Embodiments are not limited in this manner.

At block 204, the distinctiveness determination routine 155 may determine an input type for the biometric input. For example, the distinctiveness determination routine 155 may determine whether the input type is a facial input type, fingerprint input type, an iris input type, or a sound input type. The distinctiveness determination routine 155 may make the determination based on information received from the biometric sensor or an analysis of the biometric input itself, for example. At block 206, the distinctiveness determination routine 155 retrieves or requests biometric inputs of the same input type from storage, such as data storage array 135. As previously mentioned, the data storage array 135 may store a number of biometric inputs from a number of different biometric sensors. For example, the data storage array 135 may store biometric inputs from each of the biometric sensors in the sensor array 125.

The distinctiveness determination routine 155 can determine an attributes score for the biometric input received from a user's input and an average attributes score based on the biometric inputs retrieved from the storage at block 208. As previously discussed, the attributes score may be based on the type of biometric input received. Moreover, each of the biometric input types can have a different feature used to generate an attributes score.

At block 210, the distinctiveness determination routine 155 may determine a distinctiveness value for the biometric input. As mentioned, the distinctiveness value is a measurement of difference between the user's biometric input to a group of biometric inputs of the same type. In some embodiments, the distinctiveness value may be the percentage difference between the user's attributes score compared to the group's average attributes score. However, embodiments are not limited in this manner.

The distinctiveness value may be determined using other methods. For example, a number of simulated authentication operations using the biometric input can be run and the distinctiveness value can be based on a number of failed simulated authentication attempts, e.g. the percentage of failed attempts. The more failed attempts indicates the difference or distinctiveness between the biometric input and a group of biometric inputs is lower. On the other hand, the fewer failed attempts or no failed attempts indicates the difference between the biometric input and the group of biometric input is higher. Embodiments are not limited in this manner.

With reference back to FIG. 1B, in embodiments the biometric module 150 may also include a distinctiveness selection routine 160 to determine whether to use a current biometric input for an action or request a different biometric input for an action based on a distinctiveness value. The determination may be made based on the distinctiveness value being greater than, equal to, or less than a distinctiveness threshold value. A distinctiveness value greater than the distinctiveness threshold value indicates that the current or recently received biometric input is distinct or different than a group of biometric inputs of the same biometric input type. Thus, when performing an action, such as authentication, the use of the current biometric input type is likely to produce less errors than other biometric input types with lower distinctiveness values.

In embodiments, the distinctiveness threshold value may be a determined value or a value selected by a user of the system based on an acceptable error rate for authentication and identification. Moreover, the distinctiveness threshold value may be a percentage value, such as 90% indicating highly different biometric input. Embodiments are not limited to this example and any distinctiveness threshold value may be used or determined based on desires of the biometric system and/or administrators of the system.

Figure 3:
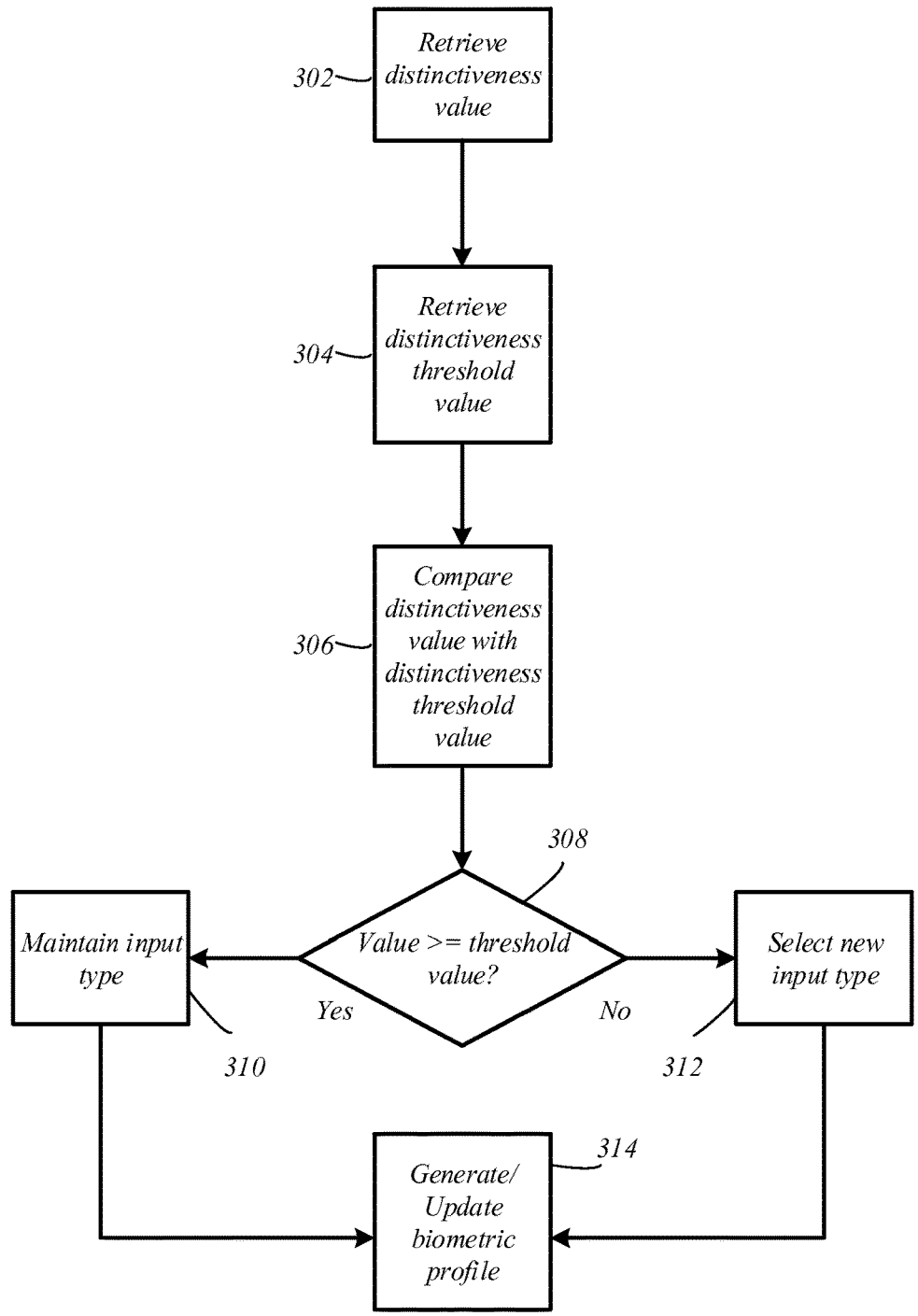
FIG. 3 illustrates an embodiment of a second flow diagram.

FIG. 3 illustrates one example logic flow 300 for processing by the distinctiveness selection routine 160 to select a biometric input. In embodiments, the distinctiveness selection routine 160 may retrieve a distinctiveness value for a biometric input at block 302. As previously mentioned, the distinctiveness value may be a percentage difference between an attributes score and an average of attributes scores or may be based on a simulated attempts using the biometric input. In embodiments, the distinctiveness value may be retrieved or received from the distinctiveness determination routine 155. However, embodiments are not limited in this manner. In some embodiments, the distinctiveness value can be retrieved from storage or sent to the distinctiveness selection routine 160.

At block 304, the distinctiveness selection routine 160 retrieves a distinctiveness threshold value for the biometric input type associated with the biometric input of the distinctiveness value being processed. In some embodiments, each of the biometric input types can have different distinctiveness threshold values or the same distinctiveness threshold value. The distinctiveness selection routine 160 may compare the distinctiveness value with the distinctiveness threshold value at block 306. More specifically, the distinctiveness selection routine 160 may make a determination as to whether the distinctiveness value is greater than, equal to, or less than the distinctiveness threshold value at decision block 308. If the distinctiveness value is greater than or equal to the distinctiveness threshold value, the biometric input type used for the biometric input is used for one or more actions at block 310. However, if the distinctiveness value is less than the distinctiveness threshold value at decision block 308, the distinctiveness selection routine 160 will select a different biometric input type than the type of the biometric input at block 312. Embodiments are not limited in this manner. In some embodiments, if the distinctiveness value is equal to the distinctiveness threshold value a different biometric input type may be selected.

In some embodiments, the distinctiveness selection routine 160 generates and/or updates a biometric profile for a user at block 314. For example, each user may have a biometric profile that includes information indicating which biometric input type is best or most distinctive for a particular user. The biometric profile for a user may include an ordered list identifying biometric input types in order by distinctiveness. Embodiments are not limited in this manner. The biometric profile may be stored in storage, such as the data storage array 135 and used when selecting a biometric input type to request a user to use when authenticating.

With reference back to FIG. 1B, the biometric module 150 also includes a biometric processing routine 165 to perform one or more actions, including processing an authentication or identification operation and a training operation. In embodiments, the biometric processing routine 165 may use the output or the generated data from the distinctiveness determination routine 155 and the distinctiveness selection routine 160 to perform the operations. For example, the biometric processing routine 165 may use a biometric input type based on a selected biometric input type and/or a biometric profile. Embodiments are not limited in this manner.

In some embodiments, the biometric processing routine 165 may update information in the biometric profile in real-time each time an authentication operation or a training operation are being performed. Thus, the biometric processing routine 165 may utilize the distinctiveness determination routine 155 and the distinctiveness selection routine 160 for processing each biometric input. For example, the biometric processing routine 165 may receive a biometric input during an authentication operation or training operation and the biometric processing routine 165 may utilize the distinctiveness determination routine 155 and the distinctiveness selection routine 160 to determine whether to continue using the current biometric input type or select a new biometric input type to perform the action based on whether the biometric input distinctiveness.

In some embodiments, the biometric processing routine 165 may determine one or more distinctiveness factors to affect the distinctiveness value either in a positive manner (more distinct) or a negative manner (less distinct) and may adjust the processing of the action based on the distinctiveness factor. A distinctiveness factor may be any factor which may increase or decrease the distinctiveness value such as focusing on a tonal frequency range, focusing on an area of a finger, focusing on an area of a face, or focusing on an area of an iris. Embodiments, are not limited to these examples and other distinctiveness factors may exist including selection of particular algorithms to process the biometric inputs, adjusting a configuration or setting, and so forth.

Figure 4:
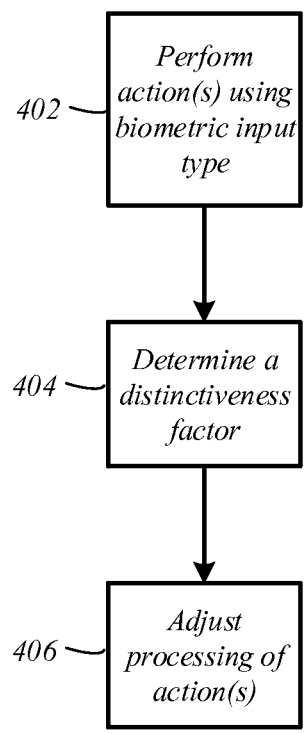
FIG. 4 illustrates an embodiment of a third flow diagram.

FIG. 4 illustrates one example logic flow 400 which may be performed by the biometric processing routine 165 to process information and to perform actions. At block 402, the biometric processing routine 165 may perform an action, such as an authentication operation or a training operation. When performing the action, the biometric processing routine 165 may select a biometric input type based on a biometric profile indicating a 'best' or most distinctive biometric input type for a user. If a biometric profile does not exist, the biometric processing routine 165 may pick a biometric input type and then utilize the distinctiveness determination routine 155 and the distinctiveness selection routine 160 to determine whether the selected biometric input type is distinctive enough based on a biometric input of the biometric input type. A new biometric input type may be chosen by the biometric processing routine 165 if the first biometric input type is not distinctive enough based on the outcome of the distinctiveness determination routine 155 and the distinctiveness selection routine 160.

In some embodiments, the biometric processing routine 165 may analyze processing of the action and determine one or more distinctiveness factors which affect the distinctiveness value in a positive or negative manner at block 404. The biometric processing routine 165 may analyze the processing by focusing on specific characteristics of a biometric input, e.g. a specific frequency tonal range, a specific area of a facial or iris image, a specific area of a fingerprint image, and so forth. In some embodiments, the biometric processing routine 165 may also determine whether changes to configurations and settings will affect the distinctiveness value. Embodiments are not limited in this manner.

At block 406, the biometric processing routine 165 may adjust processing of the action, e.g. the authentication operation or training operation, based on the distinctiveness factor(s). For example, the biometric processing routine 165 may change an area of focus for the biometric input based on the biometric input type. More specifically, the biometric processing routine 165 can focus processing of the action on a specification frequency tonal range or an area of facial, iris, or fingerprint image. The biometric processing routine 165 may also change one or more configuration and/or settings to change the distinctiveness value. These distinctiveness factors may also be saved in a user profile for later use. Embodiments are not limited in this manner.

Figure 5A:
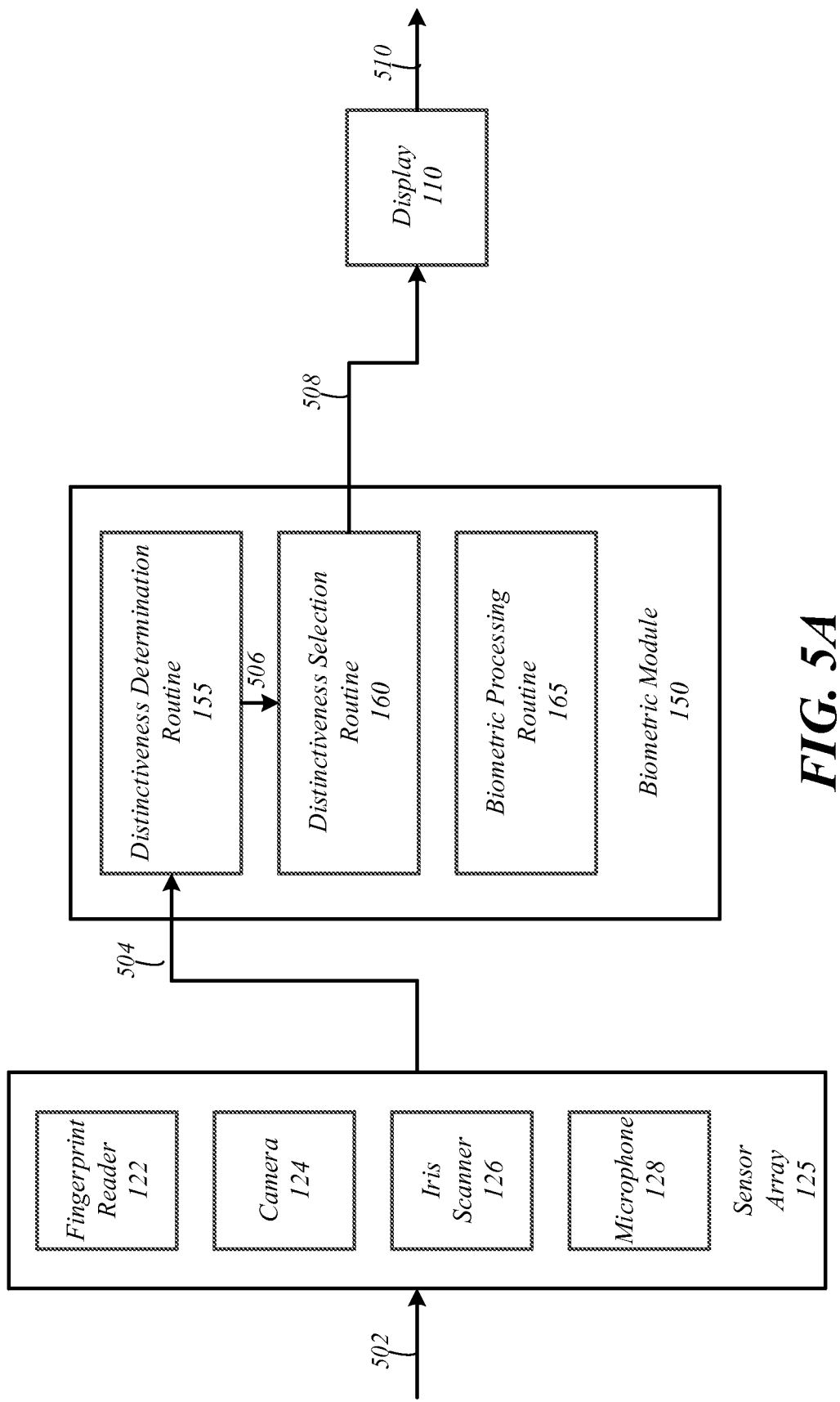
FIG. 5A illustrates an embodiment of a first processing flow diagram.

FIG. 5A illustrates one example of a processing flow diagram 500 that may be performed by system 100 and biometric module 150. As such, reference may be made to various components of system 100 and biometric module 150 when discussing processing flow diagram 500; however, embodiments are not limited in this manner. At line 502, a sensor array 125 including one or more biometric sensors, such as a fingerprint reader 122, a camera 124, an iris scanner 126, and a microphone 128, may receive a biometric input. The biometric input may be received based on a prompting of a user or without a user's knowledge. In some instances, the biometric input is received during a training operation when biometric training is being performed or during an authentication when user authentication and/or identification is being performed.

The biometric input may be of a specific biometric input type based on the biometric sensor capturing and detecting the input. For example, the fingerprint reader 122 may capture a biometric input having fingerprint input type, the camera 124 may capture a biometric input having a facial input type, the iris scanner 126 may capture a biometric input having an iris input type, and the microphone 128 may capture biometric input having a sound input type. Embodiments are not limited to these examples.

In embodiments, the sensor array 125 communicates the biometric input to the distinctiveness determination routine 155 at line 504. In embodiments, the distinctiveness determination routine 155 may receive the biometric input via one or more interconnect as one or more signals and information packets. Embodiments are not limited in this manner. The distinctiveness determination routine 155 may receive the biometric input and process the input to determine an associated distinctiveness value for input, as previously discussed above in FIGS. 1B and 2. The distinctiveness value may indicate whether the received biometric input is distinctive from a group of biometric inputs, such as a group of users or the general population.

At line 506, the distinctiveness determination routine 155 may communicate information including the distinctiveness value 160 with the distinctiveness selection routine 160. The distinctiveness selection routine 160 may process the information and data received for distinctiveness determination routine 155 and determine whether the received biometric input can be used for authentication, for example. More specifically, the distinctiveness selection routine 160 determines whether the distinctiveness value is greater than (or equal to) a distinctiveness threshold value and selects to continue using the biometric input type associated with the biometric input for training and/or authentication. If the distinctiveness value is less than the distinctiveness threshold value, another biometric input type may be selected for training and/or authentication.

The distinctiveness selection routine 160 may communicate the outcome of the selection to a display device 110 at line 508 for presenting to a user and/or administrator of the system 100. The outcome information can also be sent to other components and elements of system 100 and biometric module 150. For example, the outcome information can be sent or communicated to the biometric processing routine 165 for use in performing training and authentication. In some embodiments, the outcome information may be sent to the storage array 135.

The outcome information may indicate to the user and/or administrator whether a new biometric input type is required or not required to continue using the system at line 510. In some instances, the indication may also include a specific biometric sensor to use for authentication and/or training. Embodiments are not limited in this manner.

Figure 5B:
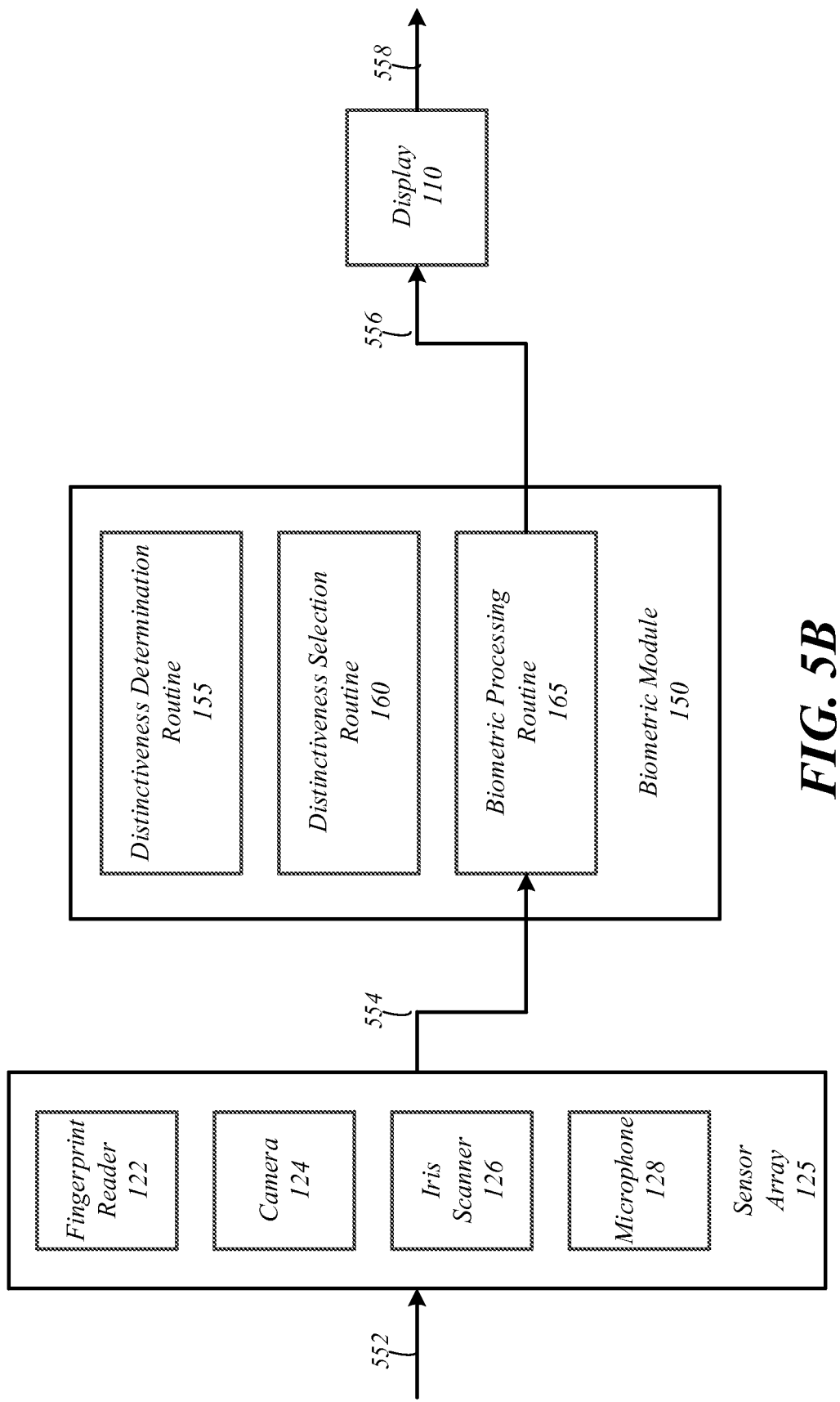
FIG. 5B illustrates an embodiment of a second processing flow diagram.

FIG. 5B illustrates another example of a processing flow diagram 550 that may be performed by system 100 and biometric module 150. In embodiments, the processing flow diagram 550 illustrates processing performed by system 100 and biometric module 150 while performing training and authentication after a biometric input type has been selected as previously discussed above in FIG. 5A.

At line 552, the sensor array 125 may receive a biometric input. The biometric sensor receiving the biometric input may have been previously selected based on a distinctiveness determination. At line 554, the biometric input is communicated to the biometric module 150, specifically, biometric processing routine 165, which may perform an action using the biometric input. For example, during a training operation, the biometric processing routine 165 may use the biometric input for training and storage of a template for a user in a data storage array 135. In another example, the biometric processing routine 165 may use the biometric to perform authentication of a user. The biometric processing routine 165 may also determine one or more distinctiveness factors for the biometric input when processing the biometric input, as previously discussed. In some instances, a distinctiveness determination may be made on a continuous or semi-continuous basis. Thus, processing, as illustrated in FIG. 5B, may also include operations performed by the distinctiveness determination routine 155 and the distinctiveness selection routine 160 after each biometric input. Embodiments are not limited in this manner.

At line 556, the biometric processing routine 165 may send output information to a display device 110 for presentation to a user and/or administrator. The output information may be dependent on the action performed by the biometric processing routine 165. For example, if authentication is being performed, the output information may indicate whether the user was successfully authenticated or not authenticated. If training is being performed, the output information may indicated whether the training step was successful or not successful. The output information can be presented to a user and/or administrator at line 558. Embodiments are not limited in this manner. Further, FIGS. 5A and 5B illustrate one potential processing flow and other processing flow may be contemplated. In some embodiments, processing flow 500 and 550 may be conducted or performed together, such that each biometric input is analyzed for distinctiveness.

Figure 6:
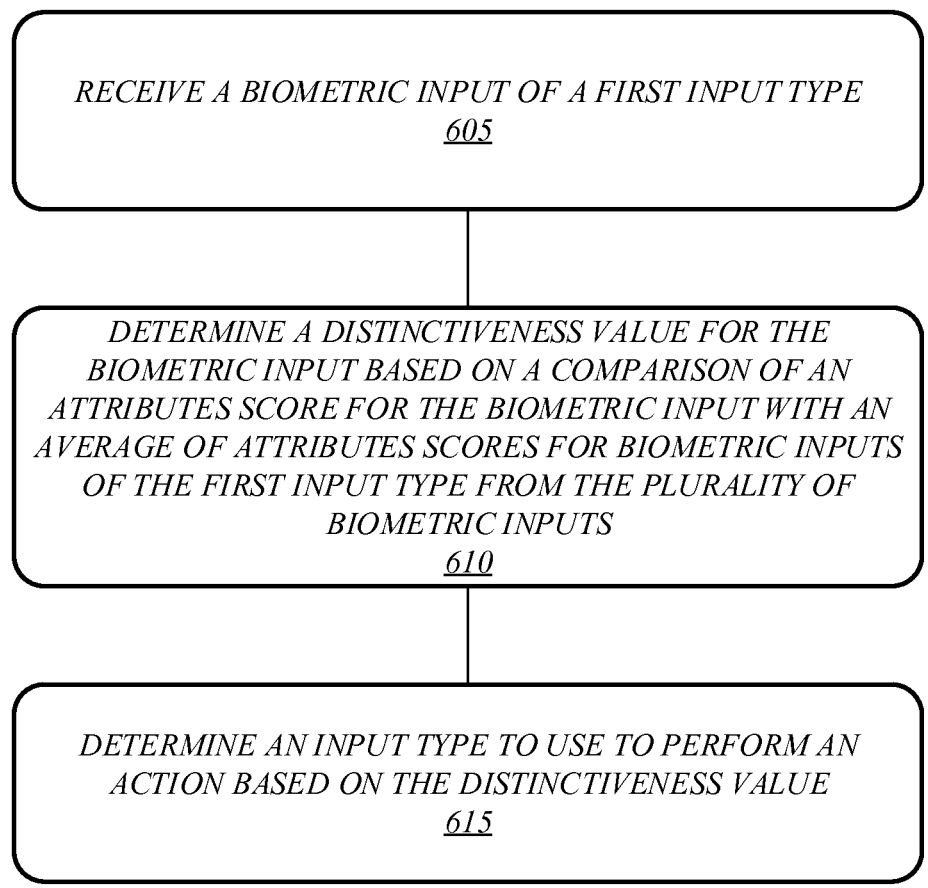
FIG. 6 illustrates an embodiment of a fourth flow diagram.

FIG. 6 illustrates an embodiment of a logic flow diagram 600. The logic flow 600 may be representative of some or all of the operations executed by one or more embodiments described herein. For example, the logic flow 600 may illustrate operations performed by one or more systems, devices, and controllers in FIGS. 1-5B. Various embodiments are not limited in this manner.

In various embodiments, the logic flow 600 may include receiving a biometric input of a first input type at block 605. The biometric input may be received by a biometric sensor, such as a fingerprint reader, a camera, an iris scanner, a microphone, and so forth. In some embodiments, the biometric input may be captured by the biometric sensor based on a prompting made by the system or without a user's knowledge.

Further, the biometric input may be of a specific biometric input type based on the biometric sensor capturing and detecting the input. For example, the fingerprint reader 122 may capture a biometric input having fingerprint input type, the camera 124 may capture a biometric input having a facial input type, the iris scanner 126 may capture a biometric input having an iris input type, and the microphone 128 may capture biometric input having a sound input type. Embodiments are not limited to these examples.

The logic flow 600 includes determining a distinctiveness value for the biometric input based on a comparison of an attributes score for the biometric input with an average of attributes scores for biometric inputs of the first input type from the plurality of biometric inputs at block 610. In embodiments, the distinctiveness value may be a percentage difference between the attributes score for the biometric input and the average of attributes scores. The attributes score are dependent on the type of biometric input and can be based on identifying features specific to the type of biometric input.

In embodiments, the logic flow 600 includes determining an input type to use to perform an action based on the distinctiveness value at block 615. The determining the input type may include selecting the input type associated with the currently received biometric input or a different input type associated with a different biometric input. The input may be selected based on whether the distinctiveness value is greater than, equal to, or less than a distinctiveness threshold value. If the distinctiveness value is greater than or, in some instances, equal to the distinctiveness threshold value, the input type may be the same input used for the received biometric input. However, if the distinctiveness value is less, and in some instances, equal to the distinctiveness threshold value the input type may be type different than the received biometric input. Embodiments are not limited in this manner.

In embodiments, once the input type is selected the action may be performed, e.g. a training operation or an authentication operation. In some embodiments, logic flow 600 may be repeated each time a biometric input is received. However, in the same or different embodiments, the input type may be selected at the beginning of the action which may require a number of biometric inputs and only be repeated each time a new action is initiated. Embodiments are not limited in this manner.

Figure 7:
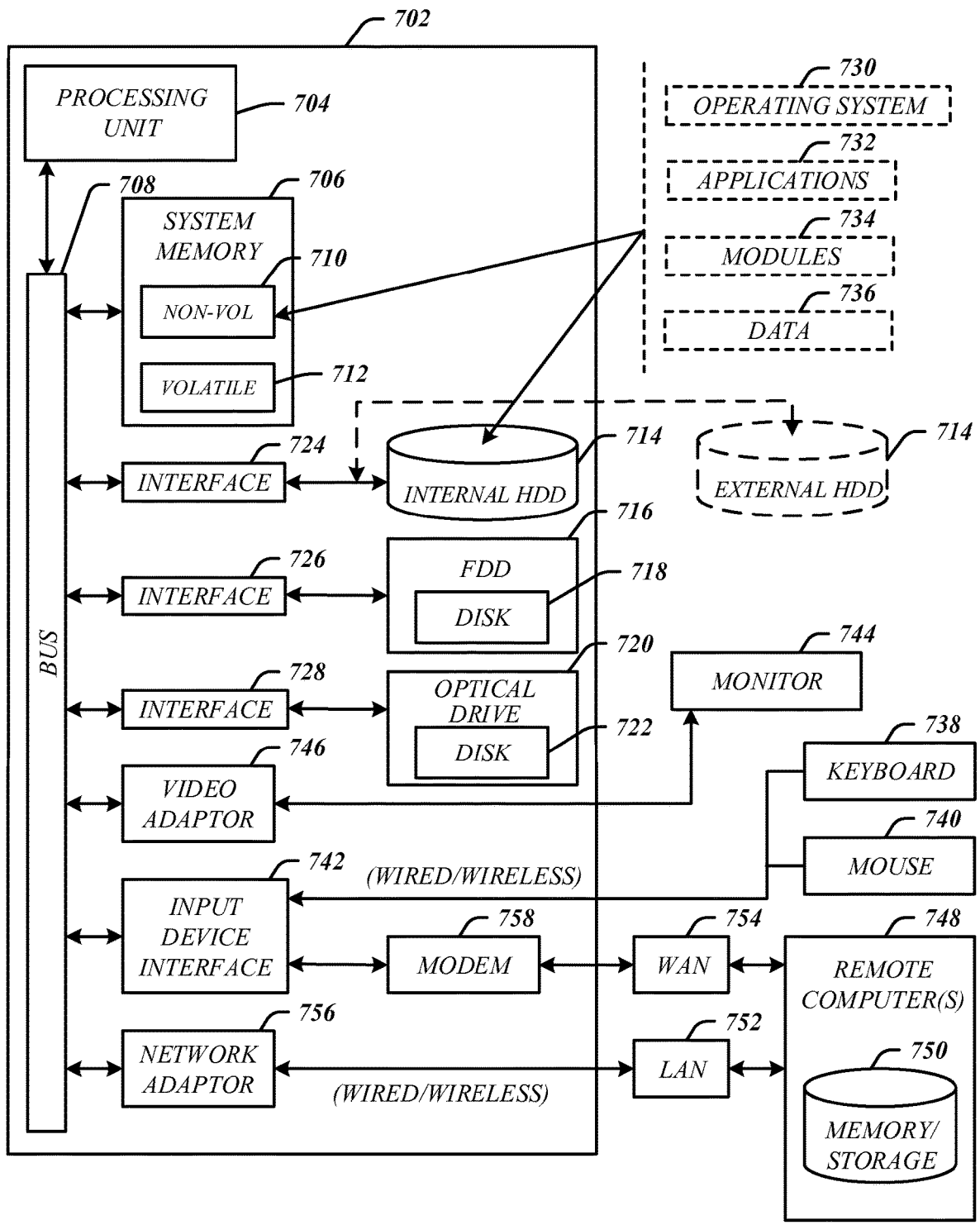
FIG. 7 illustrates an embodiment of a computing architecture.

FIG. 7 illustrates an embodiment of an exemplary computing architecture 700 suitable for implementing various embodiments and as previously described. In one embodiment, the computing architecture 700 may include elements, features, components at least partially implemented as part of system 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 702 family of standards, such as wireless devices operatively disposed in wireless communication (e.g., IEEE 702.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the systems 100 and biometric module 150 as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus may include a memory to store a plurality of biometric inputs of one or more input types, a biometric module coupled with the memory, the biometric module to receive a biometric input of a first input type, determine a distinctiveness value for the biometric input based on a comparison of an attributes score for the biometric input with an average of attributes scores for biometric inputs of the first input type from the plurality of biometric inputs, and determine an input type to use to perform an action based on the distinctiveness value.

In a second example and in furtherance of the first example, a system, device, apparatus may include the biometric module to select the first input type as the input type for use to perform the action if the distinctiveness value is greater than or equal to a distinctiveness threshold value, and select a second input type as the input type for use to perform the action if the distinctiveness value is less than to the distinctiveness threshold value.

In a third example and in furtherance of any previous example, a system, device, apparatus may include the action to comprise at least one of a training operation and an authentication operation using a biometric sensor capable of detecting the input type.

In a fourth example and in furtherance of any previous example, a system, device, apparatus may include one or more biometric sensors, each of the biometric sensors comprising a different one of a camera, a fingerprint reader, an iris scanner, and a microphone, and the input type to comprise one of a facial input type, fingerprint input type, an iris input type, and a sound input type.

In a fifth example and in furtherance of any previous example, a system, device, apparatus may include the biometric module to determine a distinctiveness factor to affect the distinctiveness value, and to adjust at least the action based on the distinctiveness factor.

In a sixth example and in furtherance of any previous example, a system, device, apparatus may include the distinctiveness factor to comprise at least one of a tonal frequency range, an area of a finger, an area of a face, and an area of an iris.

In a seventh example and in furtherance of any previous example, a system, device, apparatus may include the biometric module to perform a number of simulated authentication operations to determine the distinctiveness value based on a number of failed simulated authentication attempts.

In an eighth example and in furtherance of any previous example, a system, device, apparatus may include the biometric module to generate a biometric profile for a user based on one or more distinctiveness values each corresponding to a different biometric input type, the biometric profile to identify at least one input type to use for authentication.

In a ninth example and in furtherance of any previous example, a system, device, apparatus may a biometric array comprising one or more biometric sensors and a data storage array comprising one or more storage devices.

In a tenth example and in furtherance of any previous example, a method may include capturing, by a biometric sensor, a biometric input of a first input type, determining a distinctiveness value for the biometric input based on a comparison of an attributes score for the biometric input with an average of attributes scores for biometric inputs of the first input type from a plurality of biometric inputs, and determining an input type to use to perform an action based on the distinctiveness value.

In an eleventh example and in furtherance of any previous example, a method may include selecting the first input type as the input type for use to perform the action if the distinctiveness value is greater than or equal to a distinctiveness threshold value, and selecting a second input type, different than the first input type, as the input type for use to perform the action if the distinctiveness value is less than the distinctiveness threshold value.

In a twelfth example and in furtherance of any previous example, a method may include performing the action comprising at least one of a training operation and an authentication operation using a biometric sensor capable of capturing the input type.

In a thirteenth example and in furtherance of any previous example, a method may include determining the first input type based on the biometric sensor comprising one of a camera, a fingerprint reader, an iris scanner, and a microphone and retrieving the plurality of biometric inputs from a data storage array having a same input type as the first input type.

In a fourteenth example and in furtherance of any previous example, a method may include determining a distinctiveness factor to affect the distinctiveness value, and to adjust at least the action based on the distinctiveness factor, the distinctiveness factor comprising at least one of a focus on a feature specific to the determined input type, a system configuration, and an environment configuration.

In a fifteenth example and in furtherance of any previous example, a method may include the feature comprising a tonal frequency range, an area of a finger, an area of a face, and an area of an iris.

In a sixteenth example and in furtherance of any previous example, a method may include performing a number of simulated authentication operations to determine the distinctiveness value based on a number of failed simulated authentication attempts.

In a seventeenth example and in furtherance of any previous example, a method may include updating a biometric profile for a user based on one or more distinctiveness values each corresponding to a different biometric input type, the biometric profile to identify at least one input type to use for authentication or training.

In an eighteenth example and in furtherance of any previous example, a computer-readable medium may include instructions that, when executed, cause processing circuitry to capture a biometric input of a first input type, determine a distinctiveness value for the biometric input based on a comparison of an attributes score for the biometric input with an average of attributes scores for biometric inputs of the first input type from a plurality of biometric inputs, and determine an input type to use to perform an action based on the distinctiveness value.

In a nineteenth example and in furtherance of any previous example, a computer-readable medium may include instructions that, when executed, cause processing circuitry to select the first input type as the input type for use to perform the action if the distinctiveness value is greater than or equal to a distinctiveness threshold value and select a second input type, different than the first input type, as the input type for use to perform the action if the distinctiveness value is less than the distinctiveness threshold value.

In a twentieth example and in furtherance of any previous example, the action to comprise at least one of a training operation and an authentication operation using a biometric sensor capable of capturing the input type.

In a twenty-first example and in furtherance of any previous example, a computer-readable medium may include instructions that, when executed, cause processing circuitry to determine the first input type based on the biometric sensor comprising one of a camera, a fingerprint reader, an iris scanner, and a microphone, and retrieve the plurality of biometric inputs from a data storage array having a same input type as the first input type.

In a twenty-second example and in furtherance of any previous example, a computer-readable medium may include instructions that, when executed, cause processing circuitry to determine a distinctiveness factor to affect the distinctiveness value, and to adjust at least the action based on the distinctiveness factor, the distinctiveness factor to comprise at least one of a focus on a feature specific to the determined input type, a system configuration, and an environment configuration.

In a twenty-third example and in furtherance of any previous example, the feature to comprise at least one of a tonal frequency range, an area of a finger, an area of a face, and an area of an iris.

In a twenty-fourth example and in furtherance of any previous example, a computer-readable medium may include instructions that, when executed, cause processing circuitry to perform a number of simulated authentication operations to determine the distinctiveness value based on a number of failed simulated authentication attempts.

In a twenty-fifth example and in furtherance of any previous example, a computer-readable medium may include instructions that, when executed, cause processing circuitry to update a biometric profile for a user based on one or more distinctiveness values each corresponding to a different biometric input type, the biometric profile to identify at least one input type to use for authentication or training.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:
1. An apparatus, comprising:
memory to store a plurality of biometric inputs of two or more input types; and
a processor coupled with the memory, the memory comprising instructions that when executed by the processor cause the processor to:
receive a biometric input of a first input type of the two or more input types,
simulate a number of authentication attempts, determine a distinctiveness value for the biometric input based on a number of failed simulated authentication attempts, update a biometric profile for a user based the distinctiveness value, the biometric profile to identify at least one input type to use for authentication or training, determine an input type of the two or more input types to use to perform a training operation based on the distinctiveness value, perform the training operation, determine a distinctiveness factor based on the training operation, and adjust the training operation based on the distinctiveness factor.

2. The apparatus of claim 1, the memory comprising instructions that when executed by the processor cause the processor to select the first input type as the input type for use to perform the training operation if the distinctiveness value is greater than or equal to a distinctiveness threshold value, and select a second input type as the input type for use to perform the training operation if the distinctiveness value is less than the distinctiveness threshold value.

3. The apparatus of claim 1, the training operation to utilize a biometric sensor capable of detecting the input type.

4. The apparatus of claim 1, comprising:
one or more biometric sensors, each of the one or more biometric sensors comprising a different one of a camera, a fingerprint reader, an iris scanner, and a microphone, and
the input type to comprise one of a facial input type, fingerprint input type, an iris input type, and a sound input type.

5. The apparatus of claim 1, the memory comprising instructions that when executed by the processor cause the processor to focus the training operation on a specific characteristic of the biometric input to adjust the training operation based on the distinctiveness factor.

6. The apparatus of claim 1, the distinctiveness factor to comprise at least one of a tonal frequency range, an area of a finger, an area of a face, and an area of an iris.

7. The apparatus of claim 1, the memory comprising instructions that when executed by the processor cause the processor to perform a number of simulated authentication operations to determine the distinctiveness value based on a number of failed simulated authentication attempts.

8. The apparatus of claim 1, the memory comprising instructions that when executed by the processor cause the processor to generate a biometric profile for a user based on one or more distinctiveness values each corresponding to a different biometric input type, the biometric profile to identify at least one input type to use for authentication.

9. The apparatus of claim 1, comprising:
a biometric array comprising one or more biometric sensors;
a data storage array comprising one or more storage devices.

10. A computer-implemented method, comprising:
capturing, by a biometric sensor, a biometric input of a first input type;
simulating a number of authentication attempts;
determining a distinctiveness value for the biometric input based on a number of failed simulated authentication attempts;
updating a biometric profile for a user based the distinctiveness value, the biometric profile to identify at least one input type to use for authentication or training;
determining an input type of a plurality of input types to use to perform a training operation based on the distinctiveness value;
performing the training operation;
determining a distinctiveness factor based on the training operation; and
adjusting the training operation based on the distinctiveness factor.

11. The computer-implemented method of claim 10, comprising:
selecting the first input type as the input type for use to perform the training operation if the distinctiveness value is greater than or equal to a distinctiveness threshold value; and
selecting a second input type, different than the first input type, as the input type for use to perform the training operation if the distinctiveness value is less than the distinctiveness threshold value.

12. The computer-implemented method of claim 10, comprising:
performing the training operation using a biometric sensor capable of capturing the input type.

13. The computer-implemented method of claim 10, comprising:
determining the first input type based on the biometric sensor comprising one of a camera, a fingerprint reader, an iris scanner, and a microphone; and
retrieving the plurality of biometric inputs from a data storage array having a same input type as the first input type.

14. The computer-implemented method of claim 10, comprising:
the distinctiveness factor comprising at least one of a focus on a feature specific to the determined input type, a system configuration, and an environment configuration.

15. The computer-implemented method of claim 14, the feature comprising a tonal frequency range, an area of a finger, an area of a face, and an area of an iris.

16. The computer-implemented method of claim 10, comprising:
performing a number of simulated authentication operations to determine the distinctiveness value based on a number of failed simulated authentication attempts.

17. The computer-implemented method of claim 10, comprising:
updating a biometric profile for a user based on one or more distinctiveness values each corresponding to a different biometric input type, the biometric profile to identify at least one input type to use for authentication or training.

18. A non-transitory computer-readable medium comprising instructions that, when executed, cause processing circuitry to:
capture a biometric input of a first input type;
simulating a number of authentication attempts;
determining a distinctiveness value for the biometric input based on a number of failed simulated authentication attempts;
update a biometric profile for a user based the distinctiveness value, the biometric profile to identify at least one input type to use for authentication or training;
determine an input type of a plurality of input types to use to perform a training operation based on the distinctiveness value;
perform the training operation;

determine a distinctiveness factor based on the training operation; and adjust the training operation based on the distinctiveness factor.

19. The non-transitory computer-readable medium claim 18, comprising instructions that, when executed, cause processing circuitry to:

select the first input type as the input type for use to perform the training operation if the distinctiveness value is greater than or equal to a distinctiveness threshold value; and select a second input type, different than the first input type, as the input type for use to perform the training operation if the distinctiveness value is less than the distinctiveness threshold value.

20. The non-transitory computer-readable medium claim 18, the training operation to utilize a biometric sensor capable of capturing the input type.

21. The non-transitory computer-readable medium claim 18, comprising instructions, that, when executed, cause processing circuitry to:

determine the first input type based on a biometric sensor comprising one of a camera, a fingerprint reader, an iris scanner, and a microphone; and retrieve the plurality of biometric inputs from a data storage array having a same input type as the first input type.

22. The non-transitory computer-readable medium claim 18, the distinctiveness factor to comprise at least one of a focus on a feature specific to the determined input type, a system configuration, and an environment configuration.

23. The non-transitory computer-readable medium of claim 22, the feature to comprise at least one of a tonal frequency range, an area of a finger, an area of a face, and an area of an iris.

* * * * *